United States Patent [19]

McKenna

[11] Patent Number: 4,521,557
[45] Date of Patent: Jun. 4, 1985

[54] FLAME RETARDANT COPOLYETHERESTERS

[75] Inventor: James M. McKenna, Hockessin, Del.

[73] Assignee: E. I. Du Pont de Nemours and Company, Wilmington, Del.

[21] Appl. No.: 507,206

[22] Filed: Jun. 23, 1983

[51] Int. Cl.$^3$ .............................................. C08K 5/34
[52] U.S. Cl. ...................................................... 524/94
[58] Field of Search .................... 524/94, 412, 493; 523/179; 528/300, 308.6

[56] References Cited

U.S. PATENT DOCUMENTS

| | | | |
|---|---|---|---|
| 3,397,168 | 8/1968 | Kramer et al. | 523/179 |
| 3,624,024 | 11/1971 | Caldwell et al. | 260/40 R |
| 3,640,949 | 2/1972 | Dalzell | 260/45.75 R |
| 3,833,535 | 9/1974 | Wambach | 524/371 |
| 3,873,567 | 3/1975 | Cyba | 524/94 |
| 3,947,421 | 3/1976 | Seydl | 260/40 R |
| 3,957,905 | 5/1976 | Sumoto et al. | 524/222 |
| 4,048,128 | 9/1977 | Eastman | 524/605 |
| 4,116,925 | 9/1978 | Brachman et al. | 524/605 |

FOREIGN PATENT DOCUMENTS 2103822  2/1983  United Kingdom .

*Primary Examiner*—V. P. Hoke

[57] ABSTRACT

Flame retardant copolyetherester elastomer compositions containing effective concentrations of N,N'-ethylenebis(tetrabromophthalimide), antimony trioxide, and fumed silica.

10 Claims, No Drawings

FLAME RETARDANT COPOLYETHERESTERS

BACKGROUND OF THE INVENTION

Thermoplastic copolyetherester elastomers have gained acceptance in many fields because of their outstanding physical properties which are unique in relation to other thermoplastic polymers. However, copolyetherester elastomers are flammable and this limits their usefulness for preparing electrical parts, wire coverings and other applications where fire retardant materials are needed.

Numerous halogenated organic compounds either alone or in combination with antimony trioxide have been tested or even recommended for use in polyesters chemically related to copolyetheresters. Because of the relatively high flammability of copolyetherester elastomers, the ease with which copolyetheresters can be degraded, the tendency for fire retardants to bloom from copolyetheresters and the difficulty of retaining the elastomeric character of the copolyetheresters in the presence of significant amounts of added materials, there still is a need for fully acceptable fire retardant copolyetherester elastomer compositions. The present invention provides flame retardant copolyetherester elastomer compositions which do not exhibit degradation or blooming and which substantially retain the elastomeric character of the starting copolyetherester. Moreover, these compositions can be rendered nondripping.

SUMMARY OF THE INVENTION

The present invention provides a flame retardant copolyetherester elastomer composition which comprises (a) a copolyetherester elastomer consisting essentially of 10–75% by weight long-chain ester units having the general formula

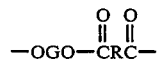

and 25–90% by weight short-chain ester units having the general formula

wherein R is a divalent radical remaining after removal of carboxyl groups from an aromatic dicarboxylic acid having a molecular weight of less than about 300, D is a divalent radical remaining after removal of hydroxyl groups from a diol having a molecular weight less than about 250, and G is a divalent radical remaining after removal of terminal hydroxyl groups from a poly(alkylene oxide) glycol having a carbon to oxygen ratio of about 2.0–4.3 and a number average molecular weight of 400–4000, (b) about 15–35 parts per hundred parts copolyetherester of N,N'-ethylenebis(tetrabromophthalimide), and (c) about 0.25–0.75 parts of antimony trioxide per part of N,N'-ethylenebis(tetrabromophthalimide). Optionally, these compositions can contain about 2–20 parts per 100 parts of copolyetherester of a finely divided inorganic solid drip suppressant having a mean particle diameter of less than 500 millimicrons.

DETAILED DESCRIPTION OF THE INVENTION

The novel flame retardant copolyetherester elastomer compositions have incorporated therein effective amounts of N,N'-ethylenebis(tetrabromophthalimide) and antimony trioxide. This combination of additives results in a flame retardant copolyetherester composition that substantially retains its elastomeric character, is stable and nonblooming.

The thermoplastic copolyetherester elastomers useful in this invention consist essentially of repeating long-chain ester units and short-chain ester units, as previously described hereinabove. The term "long-chain ester units" as applied to units in a polymer chain of the copolyetherester that is rendered flame retardant refers to the reaction product of a long-chain glycol with a dicarboxylic acid. Such "long-chain ester units", which are a repeating unit in the copolyetheresters, correspond to formula (I) above. The long-chain glycols are polymeric glycols having terminal (or as nearly terminal as possible) hydroxy groups and a number average molecular weight from about 400–4000. The long-chain glycols used to prepare the copolyetheresters are poly(alkylene oxide)glycols having a carbon-to-oxygen atomic ratio of about 2.0–4.3. Representative long-chain glycols are poly(ethylene oxide) glycol, poly(1,2- and 1,3-propylene oxide)glycol, poly(tetramethylene oxide)glycol, random or block copolymers of ethylene oxide and 1,2-propylene oxide, and random or block copolymers of tetrahydrofuran with minor amounts of a second monomer such as ethylene oxide.

The term "short-chain ester units" as applied to units in a polymer chain of the copolyetherester that is rendered flame retardant refers to units made by reacting a low molecular weight diol having a molecular weight below about 250 with an aromatic dicarboxylic acid having a molecular weight below about 300, to form ester units represented by formula (II) above.

The term "low molecular weight diols" as used herein should be construed to include equivalent ester-forming derivatives, provided, however, that the molecular weight requirement pertains to the diol only and not to its derivatives.

Aliphatic or cycloaliphatic diols with 2–15 carbon atoms are preferred, such as ethylene, propylene, tetramethylene, pentamethylene, 2,2dimethyltrimethylene, hexamethylene, and decamethylene glycols, dihydroxy cyclohexane and cyclohexane dimethanol.

The term "dicarboxylic acids" as used herein, includes equivalents of dicarboxylic acids having two functional carboxyl groups which perform substantially like dicarboxylic acids in reaction with glycols and diols in forming copolyetherester polymers. These equivalents include esters and ester-forming derivatives, such as acid anhydrides. The molecular weight requirement pertains to the acid and not to its equivalent ester or ester-forming derivative.

Among the aromatic dicarboxylic acids for preparing the copolyetherester polymers that are stabilized, those with 8–16 carbon atoms are preferred, particularly the phenylene dicarboxylic acids, i.e., phthalic, terephthalic and isophthalic acids and their dimethyl esters.

The short-chain ester units will constitute about 25–90 weight percent of the copolyetherester. The remainder of the copolyetherester will be long-chain ester units comprising about 10–75 weight percent of the copolyetherester. Preferred copolyetheresters contain 30-75 weight percent short-chain ester units and 25-70 weight percent long-chain ester units.

Preferred copolyetheresters for use in the compositions of this invention are those prepared from dimethyl terephthalate, 1,4-butanediol or ethylene glycol and poly(tetramethylene oxide)glycol having a number average molecular weight of about 600-2000 or ethylene oxide-capped poly(propylene oxide)glycol having a number average molecular weight of about 1500-2800 and an ethylene oxide content of 15-35% by weight. Optionally, up to about 30 mole percent of the dimethyl terephthalate in these polymers can be replaced by dimethyl phthalate or dimethyl isophthalate. The copolyetheresters prepared from 1,4-butanediol are especially preferred because of their rapid rates of crystallization.

The dicarboxylic acids or their derivatives and the polymeric glycol are incorporated into the copolyetherester in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of diol incorporated is still the difference between moles of diacid and polymeric glycol.

The copolyetheresters described herein are made by a conventional ester interchange reaction. A preferred procedure involves heating the dimethyl ester of terephthalic acid with a long-chain glycol and a molar excess of 1,4-butanediol in the presence of a catalyst at about 150°-260° C. and a pressure of 0.05 to 0.5 MPa, usually ambient pressure, while distilling off methanol formed by the ester interchange. Depending on temperature, catalyst, glycol excess and equipment, this reaction can be completed within a few minutes, e.g., about two minutes, to a few hours, e.g., about two hours. This procedure results in the preparation of a low molecular weight prepolymer which can be carried to a high molecular weight copolyetherester by distillation of the excess of short-chain diol. The second process stage is known as "polycondensation".

Additional ester interchange occurs during this polycondensation which serves to increase the molecular weight and to randomize the arrangement of the copolyetherester units. Best results are usually obtained if this final distillation or polycondensation is run at less than about 670 Pa, preferably less than about 250 Pa, and about 200°-280° C., preferably about 220°-260° C., for less than about two hours, e.g., about 0.5 to 1.5 hours. It is customary to employ a catalyst while carrying out ester interchange reactions. While a wide variety of catalysts can be employed, organic titanates such as tetrabutyl titanate used alone or in combination with magnesium or calcium acetates are preferred. The catalyst should be present in the amount of about 0.005 to 2.0 percent by weight based on total reactants.

Both batch and continuous methods can be used for any stage of copolyetherester polymer preparation. Polycondensation of prepolymer can also be accomplished in the solid phase by heating divided solid prepolymer in a vacuum or in a stream of inert gas to remove liberated low molecular weight diol. This method has the advantage of reducing thermal degradation because it must be used at temperatures below the softening point of the prepolymer.

A detailed description of suitable copolyetherester elastomers that can be used in the invention and procedures for their preparation are described in U.S. Pat. Nos. 3,023,192, 3,651,014, 3,763,109, and 3,766,146, the disclosures of which are incorporated herein by reference.

The flame retardant diimide, N,N'-ethylenebis(tetrabromophthalimide), can be added to and incorporated in the copolyetherester in an amount of about 15-35 parts per hundred parts of the copolyetherester, preferably 20-30 parts per hundred parts copolyetherester. The flame retardant, N,N'-ethylenebis(tetrabromophthalimide), can be prepared by reacting 2 moles of tetrabromophthalic anhydride with 1 mole of ethylene diamine in a suitable solvent such as N-methyl-2-pyrrolidone at about 200° C., as described in U.S. Pat. No. 4,374,220. Preferably, the diimide should be in finely divided form, usually having particles of less than about 100 mesh, when added to the copolyetherester.

The antimony trioxide is incorporated in the copolyetherester in an amount of about 0.25-0.75, preferably about 0.3-0.6, per part of N,N'-ethylenebis(tetrabromophthalimide). Any of the commercially available sources of antimony trioxide can be used in the copolyetherester composition.

The amounts of diimide and antimony trioxide can be varied within the limits indicated to change the degree of flame retardance obtained. Increasing the quantities of flame retardant additives increases the degree of flame retardance as measured by the UL-94 test as would be expected. The examples contained hereinafter illustrate this effect. It should be further noted that softer copolyetheresters which contain greater amounts of the more flammable polyether segments generally require slightly larger amounts of flame retardant additives than do harder copolyetheresters in order to achieve the same degree of flame retardance as measured by the UL-94 test. As shown by the examples, the thickness of test specimens also influences the degree of flame retardance obtained with given levels of flame retardant additives. Thinner sections normally require larger amounts of additives to match results with thicker sections.

Optionally, the copolyetherester elastomer can contain about 2-20 parts per 100 parts of copolyetherester of a finely divided inorganic solid drip suppressant having a mean particle diameter of less than 500, preferably less than 100, millimicrons. The drip suppressant functions as a thixotropic agent in the copolyetherester when the polymer is molten and thus diminishes or eliminates dripping of the polymer during burning. Such finely divided inorganic solids that can be used as drip suppressants that function as thixotropic agents are normally useful as pigments or reinforcing fillers in natural rubber and synthetic elastomers. Examples of finely divided inorganic solid drip suppressants include finely divided silica, carbon black, titanium dioxide and chrysotile (magnesium silicate). Finely divided silica is the preferred drip suppressant and fumed colloidal silica is especially preferred. Because of its high efficiency, fumed colloidal silica is preferably added to and incorporated in the copolyetherester in amounts of about 3-8 parts per 100 parts of copolyetherester. It should be noted that when the diimide and antimony trioxide are used at high levels in the absence of a drip suppressant, that the drops of copolyetherester generated are nonburning and are, therefore, unlikely to lead to fire spreading.

It has been found that when N,N'-ethylenebis(tetrabromophthalimide), antimony trioxide and a drip suppressant are all present in the copolyetherester in about maximum amounts, that the elastomeric character of the composition is significantly reduced compared to the elastomeric character of the starting copolyetherester without any additives. This effect is most noticeable with copolyetheresters having a high proportion of short-chain ester units. While such compositions are useful, it is usually preferable to use compositions in which the amounts of diimide, antimony trioxide and drip suppressant have been adjusted to near the lowest levels which provide the degree of flame retardance required and prevent dripping.

Any method which provides uniform mixing of the diimide and antimony trioxide and, optionally, drip suppressant with the copolyetherester elastomer can be used to prepare the compositions of this invention. A preferred procedure involves dry blending all of the ingredients together followed by melt blending of the dry blend in single or twin screw extruder-mixers or internal mixers such as the Farrell Continuous Mixer at a temperature above the melting point of the copolyetherester. In order to make the required dry blend, the copolyetherester preferably should be in finely divided form such that it would pass through a 20-mesh screen. The compositions can also be made by adding the diimide, antimony trioxide and drip suppressant to molten copolyetherester elastomer in a batch mixer or agitated vessel. The solid ingredients can be added separately in any order or may be dry blended prior to addition to the molten copolyetherester if desired.

Another convenient procedure for preparing the compositions of this invention makes use of a concentrated masterbatch of diimide and antimony trioxide and, optionally, a drip suppressant bound together by a minor amount of copolyetherester. Usually the concentrated masterbatch contains 15 to 35 percent by weight of copolyetherester which serves to bind the fire retardant ingredients into pellets. The pellets of concentrated fire retardant ingredients can be dry blended with pellets of unaltered copolyetherester and the pellet blend can in turn be fed directly to an injection molding machine or extruder to form fire retardant finished articles directly. The required concentrates can be prepared by mixing procedures such as those described hereinbefore.

It is usually desirable to stabilize the compositions of this invention toward heat and/or light. As antioxidants, hindered phenols or aryl amines are effective. Mixtures of these antioxidants with esters of thiodipropionic acid, mercaptides phosphite esters and the like are useful. Stabilization against light can be obtained by compounding with UV-absorbers or hindered amine photostabilizers. The use of these various agents in copolyetheresters is known to those skilled in the art.

The compositions of this invention can be readily processed by a variety of techniques such as injection molding, compression molding and extrusion.

EXAMPLES

In the following examples, which further illustrate the present invention, parts and percentages are by weight unless otherwise indicated.

Copolyester A is prepared according to the following procedure: To a flask fitted with a distillation column and a stainless steel stirrer with a paddle cut to conform with the internal radius of the flask and positioned about 3 mm from the bottom of the flask, the following starting materials are charged:

poly(tetramethylene oxide)glycol: 439 parts
(number average molecular weight 990) dimethyl terephthalate: 748 parts
1,4-butanediol: 400 parts
4,4'bis($\alpha,\alpha'$-dimethylbenzyl)diphenylamine: 12 parts
5 parts tetrabutyl titanate in 95 parts 1,4-butanediol: 100 parts The flask is placed in an oil bath at 160° C., agitated for five minutes and then the tetrabutyl titanate/1,4-butanediol solution is added. Methanol distills from the reaction mixture as the temperature is slowly raised to 250° C. over a period of one hour. When the temperature reaches 250° C., the pressure is gradually reduced to about 270 Pa within 20 minutes. The polymerization mass is agitated at 250° C. for 55–90 minutes. The condensation polymerization is discontinued by releasing the vacuum under nitrogen and the resulting viscous molten product is scraped from the flask in a nitrogen (water and oxygen free) atmosphere and allowed to cool. The resulting polymer has a melt index of 9–11 g/10 min, measured at 230° C., and an acid content of 60 meg/kg[1]. After shredding, the polymer is extruded at 220° C. to a 3–4 mm strand and granulated to a 35-mesh particle size.

[1] The carboxyl group content is determined by dissolving the copolyester in o-cresol, adding o-dichlorobenzene, and titrating the solution with standardized ethanolic potassium hydroxide. The end point is determined visually using bromophenol blue as indicator.

Copolyester B is prepared substantially according to the procedure used to prepare Copolyester A, from the following starting materials:

dimethyl terephthalate: 75.1 parts
poly(tetramethylene oxide)glycol: 15.8 parts
(number average molecular weight 990) 1,4-butanediol: 50.0 parts
N,N'-hexamethylenebis(3,5-di-tert-butyl-4-hydroxyhydrocinnamamide): 0.15 parts
N,N'-trimethylenebis(3,5-di-tert-butyl-4-hydroxyhydrocinnamamide): 0.15 parts
tetrabutyl titanate: 0.2 parts Copolyester C is prepared substantially according to the procedure used to prepare Copolyester A, using the following starting materials:

dimethyl terephthalate: 62 parts
dimethyl isophthalate: 18 parts
poly(tetramethylene oxide)glycol: 70 parts (number average molecular weight 1000)
butanediol: 50 parts
N,N'-hexamethylenebis(3,5-di-tert-butyl-4-hydroxyhydrocinnamamide): 2.3 parts
N,N'-trimethylenebis(3,5-di-tert-butyl-4-hydroxyhydrocinnamamide): 2.3 parts
tetrabutyl titanate: 0.3 parts The following ASTM methods are employed in determining the properties of the polymer compositions prepared in the examples which follow.

Tensile strength, elongation at break,
100% modulus: D412
Melt flow index: D1238

The flammability characteristics are determined according to the vertical burning test of the Underwriters Laboratories, Inc., Standard UL 94, 1980, with modified specimen conditioning; set of five specimens in a circulating air oven for 2 hours at 100° C., then cooled in a dessicator over anhydrous calcium chloride for 2 hours at room temperature prior to testing. The V-0 classification indicates a higher degree of flame retardance than does a V-2 classification.

EXAMPLE I

A series of samples is prepared from the ingredients in the amounts shown in the following table.

| Ingredients | 1A | 1B | SAMPLE 1C | 1D | CONTROL 1E |
|---|---|---|---|---|---|
| Copolyester A, 35 mesh | 100 | 100 | 100 | 100 | 100 |
| N,N'—Ethylenebis(tetrabromophthalimide) | 20 | 20 | 20 | 20 | — |
| Antimony trioxide | 10 | 10 | 10 | 10 | — |
| Colloidal fumed silica (Cabosil ® S-17, Cabot Corp., Boston, Mass.) | 0 | 2.5 | 5 | 10 | — |

The materials were dry blended and the dry blend was compounded on a Brabender Prep Center, a heated batch sigma blade mixer. The compositions were granulated and compression molded at 230° C. Test specimens were died out from compression molded slabs into 127 mm × 12.7 mm × 1.6 mm specimens or directly compression molded into 127 mm × 12.7 mm × 3.2 mm specimens. Test results at two specimen thicknesses are as follows:

| | 1A | 1B | 1C | 1D | CONTROL 1E |
|---|---|---|---|---|---|
| UL-94 classification, 3.2 mm specimen | V-2 | V-2 | V-0 | V-0 | HB[1] |
| Dripping while burning | Yes | No | No | No | Yes |
| UL-94 classification, 1.6 mm specimen | V-2 | V-0 | V-0 | V-0 | HB[1] |
| Dripping while burning | Yes | Yes | No | No | Yes |
| Melt flow index, 230° C. | 12.3 | 12.1 | 6.9 | 3.3 | 10.4 |
| 100% modulus, MPa | 16.9 | 16.2 | 16.9 | 17.6 | 17.9 |
| Tensile strength, MPa | 23.1 | 20.7 | 21.5 | 18.3 | 32.4 |
| Elongation at break, % | 520 | 480 | 445 | 300 | 700 |

[1]Specimen burns to holding clamp and does not meet requirements for V-2 classification Addition of 5 or 10 parts of fumed colloidal silica results in non-dripping compositions during combustion. At 2.5 parts of fumed colloidal silica, the effect is marginal because the 3.2 mm specimen drips while the 1.6 mm specimen does not.

All of the samples retain useful tensile properties. It is particularly significant that the modulus at 100% remains substantially unchanged because in nearly all applications, copolyetheresters are not subjected to extension beyond 100%. Addition of fumed colloidal silica results in an increase in melt viscosity. There is no increase in melt flow index for any of the samples relative to the control 1E which would indicate degradation of the copolyetherester. After storage for 3 months at ambient temperature, there is no bloom on any of the specimens.

EXAMPLE II

A series of samples is prepared from the ingredients and the amounts shown in the following table.

| Ingredients | 2A | 2B | 2C | 2D | 2E | 2F | 2G | 2H |
|---|---|---|---|---|---|---|---|---|
| Copolyester A, 35 mesh | 100 | 100 | 100 | 100 | 100 | 100 | 100 | 100 |
| N,N'—Ethylenebis(tetrabromophthalimide) | 20 | 20 | 20 | 25 | 25 | 30 | 30 | 30 |
| Antimony trioxide | 10 | 10 | 10 | 12.5 | 12.5 | 15 | 15 | 15 |
| Colloidal fumed silica, (Cabosil ® S-17, Cabot Corp., Boston, Mass.) | 0 | 5 | 10 | 0 | 5 | 0 | 5 | 10 |

The samples are prepared substantially by the procedures in Example I and the results are follows:

| | 2A | 2B | 2C | 2D | 2E | 2F | 2G | 2H |
|---|---|---|---|---|---|---|---|---|
| Melt flow index, 220° C. | 12.3 | 7.6 | 2.6 | 11.2 | 8.0 | 13.2 | 8.5 | 2.4 |
| Melt flow index, 230° C. | 19.7 | 8.0 | 3.3 | 16.4 | 10.6 | 16.7 | 9.9 | 3.8 |
| UL-94 classification, 3.2 mm specimen | V-2[1] | V-0 | V-0 | V-0[2] | V-0 | V-0[2] | V-0 | V-0 |
| 100% modulus MPa | 16.9 | 15.0 | 17.6 | 15.9 | 16.6 | 15.5 | 16.9 | — |
| Tensile strength, MPa | 23.1 | 17.2 | 18.3 | 19.8 | 17.2 | 16.6 | 16.9 | 19.0 |
| Elongation at break, % | 520 | 400 | 300 | 470 | 330 | 320 | 100 | 35 |

[1]Flaming drips
[2]Non-flaming drips

Samples 2D and 2E exhibit a high level of flame retardance (V-0) and substantially retain their elastomeric character. The presence of 5 parts of fumed colloidal silica in sample 2E effectively eliminates dripping. It should be noted that the drops falling from sample 2D are non-flaming.

Samples 2G and 2H employing higher levels of flame retardant agents and fumed colloidal silica as well in the copolyetherester, while useful show a reduction in elastomeric character evidenced by their elongation at break.

After 3 months storage at ambient temperature, none of the samples exhibit blooming.

EXAMPLE III

The following sample is prepared by the procedures of Example I.
Ingredients
Copolyester B: 100
N,N'-Ethylenebis(tetrabromophthalimide): 20
Antimony trioxide: 10
Colloidal fumed silica: 5
Test results at 3.2 mm specimen thickness are as follows:
UL-94 classification: V-0
Dripping while burning: No
Melt flow index, 230° C.: 12

EXAMPLE IV

The following sample is prepared substantially by the procedures of Example I using the following ingredients:
Copolyester C, 35 mesh: 100
N,N'-Ethylenebis(tetrabromophthalimide): 25
Antimony trioxide: 12.5
Colloidal fumed silica, (Cabosil ®S-17): 5

Test specimens are prepared as in Example I and the following test results are obtained:
UL-94 classification, 3.2 mm thickness: V-0, without dripping
UL-94 classification, 1.7 mm thickness: V-0, without dripping
Melt flow index, 200° C.: 3.2
100% modulus, MPa: 11.0
Tensile strength, MPa: 23.8
Elongation at break, %: 530

COMPARATIVE EXAMPLES

A series of control samples are prepared and tested by the procedures of Example 1 using the following formulation:
Copolyester A: 100 parts
Halogenated flame retardant as indicated below: 25 parts
Antimony trioxide: 12.5 parts The specific halogenated flame retardants used and the results obtained therewith are tabulated below:

| Flame Retardant | Test Results and Observations |
| --- | --- |
| Decabromodiphenyl oxide | Effective as a flame retardant, but blooms from the sample. |
| Octabromodiphenyl oxide | Effective as a flame retardant, but blooms from the sample. |
| Pentabromodiphenyl oxide | Not as effective as N,N'—ethylenebis(tetrabromophthalimide), also blooms. |
| Ethylenebis(dibromonorbornene dicarboximide | Degrades copolyester at 200° C. as evidenced by increased melt flow index. |
| Decabromodiphenoxyethane | Difficult to mix with copolyester, effective as flame retardant, but blooms. |
| Poly(tribromostyrene) | Not as effective as N,N'—ethylenebis(tetrabromophthalimide) as a flame retardant. At higher concentrations causes substantial loss of copolyester physical properties. |
| Poly(dibromophenylene oxide) | Not as effective as N,N'—ethylenebis(tetrabromophthalimide). At higher concentrations, causes substantial loss of copolyester physical properties. |
| Dodecachlorodimethanodibenzocyclooctane | Limited effectiveness as a flame retardant. |
| Hexabromocyclododecane | Degrades the copolyester as evidenced by increased melt flow index. |
| Tetrabromophthalic anhydride | Degrades the copolyester as evidenced by increased melt flow index. |
| Chlorendic anhydride | Limited effectiveness as flame retardant; also causes degradation of copolyester. |

I claim:
1. A flame retardant copolyetherester elastomer composition which comprises
   (a) a copolyetherester elastomer consisting essentially of 10–75% by weight long-chain ester units having the general formula

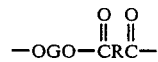

and 25–90% by weight short-chain ester units having the general formula

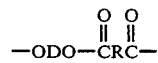

wherein R is a divalent radical remaining after removal of carboxyl groups from an aromatic dicarboxylic acid having a molecular weight less than about 300; D is a divalent radical remaining after removal of hydroxyl groups from a diol having a molecular weight less than about 250; and G is a divalent radical remaining after removal of terminal hydroxyl groups from a poly(alkylene oxide)glycol having a carbon to oxygen ratio of about 2.0–4.3 and a number average molecular weight of 400–4000,
   (b) about 15–35 parts per hundred parts copolyetherester of N,N-ethylenebis(tetrabromophthalimide),
   (c) about 0.25–0.75 parts of antimony trioxide per part of N,N'-ethylenebis(tetrabromophthalimide), and
   (d) about 2–20 parts per hundred parts of copolyetherester elastomer of fumed colloidal silica.

2. A composition of claim 1 containing about 20–30 parts per 100 parts copolyetherester of N,N'-ethylenebis(tetrabromophthalimide).

3. A composition of claim 1 containing about 0.3–0.6 parts of antimony trioxide per part of N,N'-ethylenebis(tetrabromophthalimide).

4. The composition of claim 1 wherein the fumed colloidal silica is present in an amount of about 3–8 parts per 100 parts of copolyetherester elastomer.

5. The composition of claim 5 containing about 20–30 parts per 100 parts copolyetherester of N,N-ethylenebis(tetrabromophthalimide).

6. A composition of claim 1 where the short-chain ester units are present in an amount of from about 30–75% by weight of said copolyetherester.

7. A composition of claim 1 where the short-chain ester units are derived from terephthalic acid and 1,4-butanediol.

8. A composition of claim 1 where the short-chain ester units are derived from terephthalic acid and ethylene glycol.

9. A composition of claim 1 where the long-chain ester units are derived from terephthalic acid and poly(tetramethylene oxide)glycol having a number average molecular weight of about 600–2000.

10. A composition of claim 1 where the long chain ester units are derived from terephthalic acid and ethylene oxide-capped poly(propylene oxide)glycol having a number average molecular weight of about 1500–2800 and an ethylene oxide content of 15–35% by weight.

* * * * *

UNITED STATES PATENT AND TRADEMARK OFFICE
CERTIFICATE OF CORRECTION

PATENT NO. : 4,521,557
DATED : June 4, 1985
INVENTOR(S) : James Michael McKenna

It is certified that error appears in the above—identified patent and that said Letters Patent is hereby corrected as shown below:

Column 10, line 43, "claim 5" should read "claim 4"

Signed and Sealed this

Twenty-fourth Day of September 1985

[SEAL]

Attest:

Attesting Officer

DONALD J. QUIGG

Commissioner of Patents and Trademarks—Designate